United States Patent
Koji et al.

(10) Patent No.: US 8,383,053 B2
(45) Date of Patent: Feb. 26, 2013

(54) MICROWAVE REACTOR AND METHOD OF PRODUCING POLYMER COMPOUND USING THE SAME

(75) Inventors: Shinnosuke Koji, Kawasaki (JP); Takayuki Hiratani, Tokyo (JP); Kazumichi Nakahama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/214,539

(22) Filed: Aug. 22, 2011

(65) Prior Publication Data
US 2012/0048721 A1 Mar. 1, 2012

(30) Foreign Application Priority Data
Aug. 25, 2010 (JP) .................................. 2010-188490

(51) Int. Cl.
*B01J 19/08* (2006.01)

(52) U.S. Cl. ........................................................ 422/186
(58) Field of Classification Search ................... 422/186
See application file for complete search history.

(56) References Cited

U.S. PATENT DOCUMENTS
5,932,075 A 8/1999 Strauss et al.

*Primary Examiner* — Kishor Mayekar
(74) *Attorney, Agent, or Firm* — Canon U.S.A. Inc., IP Division

(57) ABSTRACT

Provided is a microwave reactor including a reaction container for receiving a reaction solution, a microwave radiator for irradiating the reaction solution received in the reaction container with microwaves, and a cooler for cooling the reaction solution received in the reaction container, wherein a heat-generating medium generating heat by absorbing the microwaves is arranged on a surface of the cooler or in the vicinity of the surface at a position receiving the microwaves from the microwave radiator through the reaction solution.

5 Claims, 3 Drawing Sheets

LOW-TEMPERATURE REGION

MICROWAVE REACTOR AND METHOD OF PRODUCING POLYMER COMPOUND USING THE SAME

BACKGROUND OF THE INVENTION

1. Field of the Invention

The present invention relates to a microwave reactor and a method of producing a polymer compound using the reactor.

2. Description of the Related Art

It has been reported that microwave irradiation to a chemical reaction system, such as a synthesis reaction, a decomposition reaction, or an oxidation-reduction reaction, accelerates the chemical reaction and enhances the reaction rate. At present, these chemical reactions under microwave irradiation are positioned in the technical field of microwave chemical process and have been diligently studied.

In general, there is a correlation between the power of microwave radiation and the chemical reaction-accelerating effect, and it is possible to further enhance the reaction rate by increasing the power of microwave radiation. However, irradiation with high-power microwaves may induce excessive heating of the chemical reaction system to make the control of the chemical reaction difficult. Thus, the irradiation is disadvantageous from the viewpoint of chemical reaction control. As a method of solving these problems, U.S. Pat. No. 5,932,075 discloses a microwave reactor equipped with a cooler.

However, according to investigation of the present inventor, in a chemical reaction using a microwave reactor equipped with a cooler like that disclosed in U.S. Pat. No. 5,932,075, the chemical reaction-accelerating effect by high-power microwave irradiation was not observed in some cases. As the reason of this, the present inventor conjectures that a low-temperature region, the temperature of which has been rapidly decreased, is generated in the vicinity of the cooler and that a chemical reaction-inhibiting effect caused by this low-temperature region competes with the chemical reaction-accelerating effect of the microwave irradiation.

The low-temperature region herein indicates the region that is generated in the vicinity of a cooler placed inside a reaction solution and the temperature of which has been rapidly cooled. It is thought that in the low-temperature region, there is further a cool-temperature region in which the reaction rate is one half or less of the reaction rate in the heated reaction solution.

If the cooling by the cooler is stopped in order to inhibit the occurrence of the low-temperature region, the temperature of the reaction solution increases to the boiling point thereof or more, and thereby the chemical reaction does not proceed as expected.

SUMMARY OF THE INVENTION

Aspects of the present invention provide a microwave reactor that can solve the problems caused by occurrence of the low-temperature region and can effectively accelerate a chemical reaction and provide a method of producing a polymer compound.

The microwave reactor according to aspects of the present invention includes a reaction container for receiving a reaction solution, a microwave radiator for irradiating the reaction solution received in the reaction container with microwaves, and a cooler for cooling the reaction solution received in the reaction container, wherein a heat-generating medium generating heat by absorbing the microwaves is arranged on a surface of the cooler or in the vicinity of the surface at a position receiving the microwaves from the microwave radiator through the reaction solution.

According to aspects of the present invention, in the microwave reactor, the heat-generating medium arranged in the vicinity of the cooler generates heat and applies the heat to the reaction solution in the region which will become a cool-temperature region. Thus, a chemical reaction is accelerated by inhibiting the occurrence of the cool-temperature region or reducing the volume of the cool-temperature region.

Further features of the present invention will become apparent from the following description of exemplary embodiments with reference to the attached drawings.

DESCRIPTION OF THE EMBODIMENTS

A microwave reactor according to aspects of the present invention will now be described with reference to the drawings.

In the microwave reactor according to aspects of the present invention, a heat-generating medium that generates heat by absorbing microwaves is arranged on a surface of a cooler or in the vicinity of the surface. The heat-generating medium is arranged so as to receive microwaves supplied from a microwave radiator through a reaction solution. Herein, the term "the vicinity of the surface of a cooler" is, for example, a cool-temperature region and, specifically, can be a region within 1 cm from the cooler.

Figure 1:
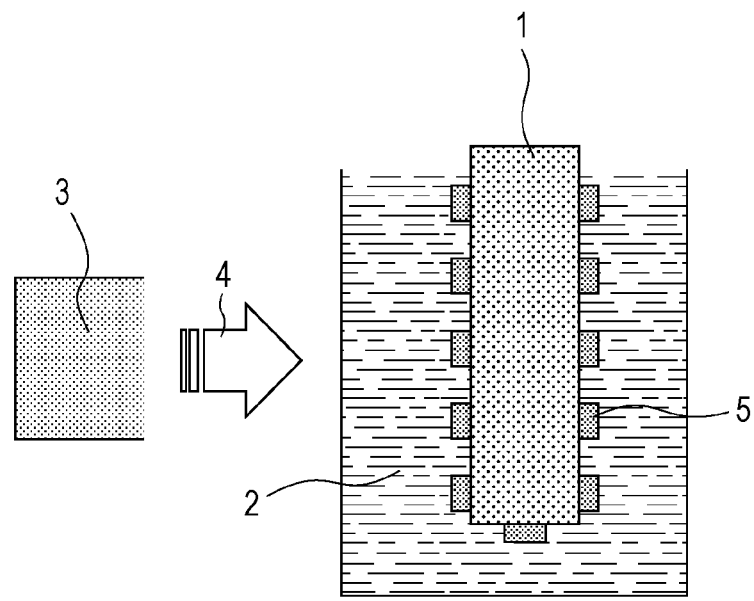
FIG. 1 is a diagram illustrating a first embodiment of the microwave reactor of the present invention.

FIG. 1 shows a first embodiment of the microwave reactor of the present invention. This microwave reactor includes a reaction container 2 for receiving a reaction solution, a microwave radiator 3 for irradiating the reaction solution received in the reaction container 2 with microwaves, and a cooler 1 for cooling the reaction solution received in the reaction container 2. A heat-generating medium 5 that generates heat by absorbing microwaves is arranged on a surface of the cooler 1 or in the vicinity of the surface at a position receiving microwaves 4 from the microwave radiator 3 through the reaction solution.

The first embodiment provides a configuration in which the cooler is located inside the reaction container.

The direction of microwave radiation may be any direction, and the reaction solution may be irradiated with microwaves from one direction or from the circumference of the reaction container. In the microwave reactor according to this embodiment, the heat-generating medium 5 that generates heat by absorbing microwaves 4 is placed on a part of a surface of the cooler 1 or in a part of the vicinity of the surface.

Figure 2:
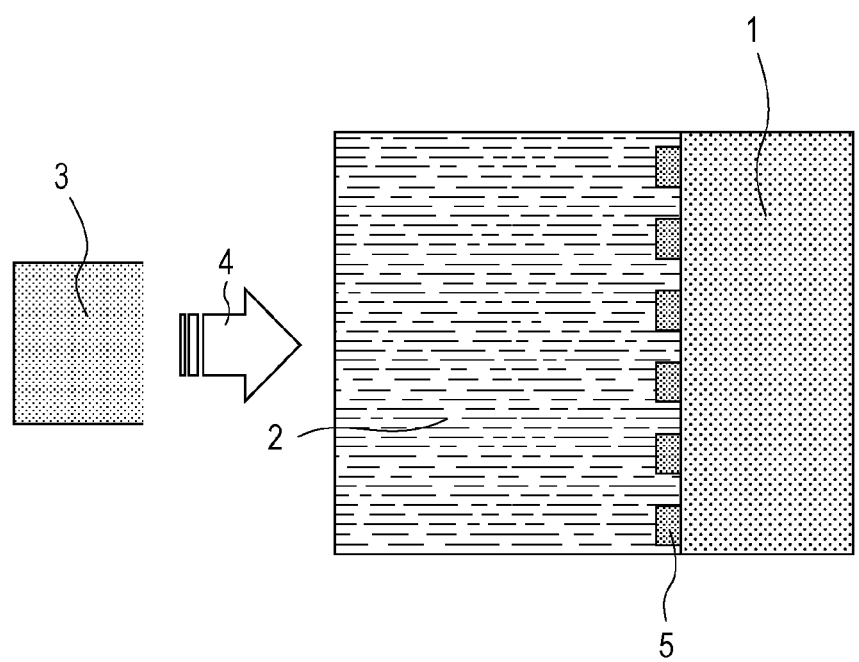
FIG. 2 is a diagram illustrating a second embodiment of the microwave reactor of the present invention.

FIG. 2 shows a second embodiment of the microwave reactor of the present invention. This microwave reactor includes a reaction container 2 for receiving a reaction solution, a microwave radiator 3 for irradiating the reaction solution received in the reaction container 2 with microwaves, and a cooler 1 for cooling the reaction solution received in the reaction container 2. A heat-generating medium 5 that generates heat by absorbing microwaves is arranged on a surface of the cooler 1 or in the vicinity of the surface at a position receiving microwaves 4 from the microwave radiator 3 through the reaction solution.

The second embodiment provides a configuration in which the cooler is located outside the reaction container. The cooler 1 in the microwave reactor of this embodiment is placed so as to be adjacent to the reaction container 2 and is located on the downstream side of the reaction container 2 with respect to the radiation direction (the propagation direction shown by the arrow in the drawing) of microwaves 4 radiated from the microwave radiator 3. Furthermore, the heat-generating medium 5 that generates heat by absorbing the microwaves 4 is placed at, herein, as the vicinity of a surface of the cooler, a part of a boundary surface between the cooler 1 and the reaction container 2 or a part of the vicinity of the boundary surface.

By arranging the reaction container 2 and the cooler 1 as shown in FIG. 1 or 2, excessive heating of a chemical reaction system, which is induced by irradiation with high-power microwaves 4, can be inhibited. The radiated microwaves 4 are partially absorbed by the reaction solution in the reaction container 2, and the microwaves that passed through the reaction solution without being absorbed by the reaction solution are partially absorbed by the heat-generating medium 5. It is thought that as a result, the heat-generating medium 5 generates heat, and the locally generated heat raises the temperature of the reaction solution in the cool-temperature region occurring in the reaction container 2 due to the cooler 1, and thereby inhibition of a chemical reaction due to the cool-temperature region can be reduced. In addition, it is thought that a locally hot-temperature region is generated in a cool-temperature reaction solution, and the chemical reaction is accelerated in this hot-temperature region.

Accordingly, the heat-generating medium 5 is not only arranged on a boundary surface between the reaction container 2 and the cooler 1 but also may be arranged in the vicinity of the boundary surface so that a locally hot-temperature region is generated in the vicinity of the surface of the cooler 1.

Figure 3:
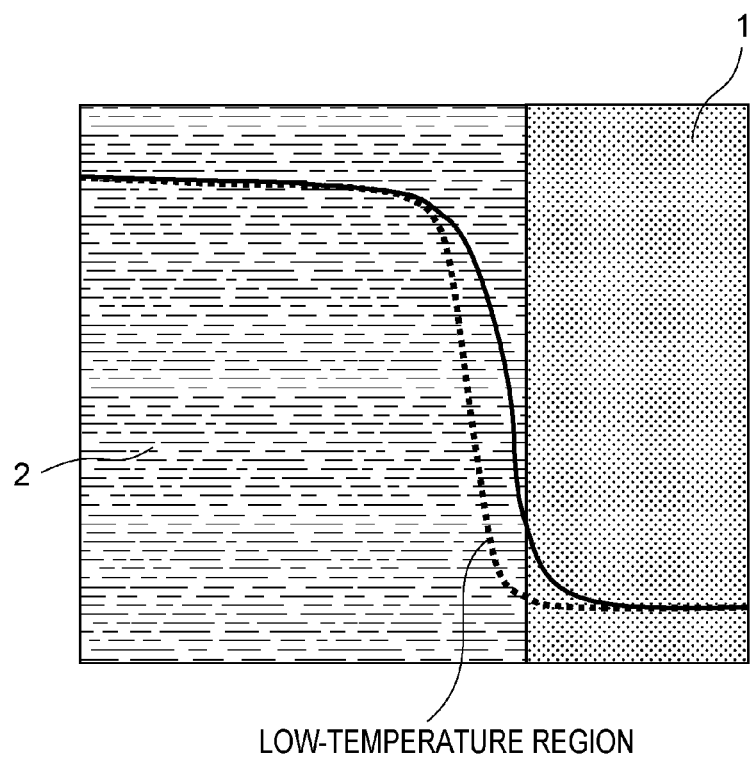
FIG. 3 is a schematic diagram illustrating temperature gradients in a reaction container of a known reactor and a reaction container of a reactor of the present invention.

The present inventor believes that as shown in FIG. 3, when a reaction container 2 having a known cooler not having a heat-generating medium is irradiated with microwaves, a cool-temperature region, which is a region of which temperature has been rapidly decreased, and even a low-temperature region are generated in the vicinity of the cooler 1, as shown by the dotted line in FIG. 3, and thereby acceleration of the chemical reaction is inhibited. On the other hand, the reactor according to the embodiment includes a heat-generating medium that generates heat by absorbing microwaves on a boundary surface between the reaction container 2 and the cooler 1 or in the vicinity of the boundary surface. In the reaction container 2 of the reactor according to aspects of the present invention, a locally hot-temperature region is generated in the vicinity of the heat-generating medium 5, as shown by the solid line in FIG. 3, to reduce the volume of the cool-temperature region generated in the vicinity of the cooler 1 and thereby accelerate the chemical reaction.

FIG. 3 schematically illustrates a state of temperature distribution, but the temperature of the surface of the cooler 1 becomes a temperature that is equal to that of the cooler at the portion where the heat-generating medium is not provided and becomes a temperature that is determined by the heat generated by the heat-generating medium at the portion where the heat-generating medium is provided.

The heat-generating medium 5 is, as described above, arranged on a surface of the cooler or the vicinity of the surface. For example, the heat-generating medium 5 is arranged on a boundary surface between the reaction container 2 and the cooler 1 or in the vicinity of the boundary surface. The heat-generating medium 5 can be a heat-generating medium formed on the boundary surface by a physical or chemical film-forming method, such as sputtering, vapor deposition, or CVD, so as to have a microwave-absorbing ability. The heat-generating medium 5 can have a shape such as a ribbon, bar, mesh, foil, thin plate, paper, or cloth.

Figure 4A:
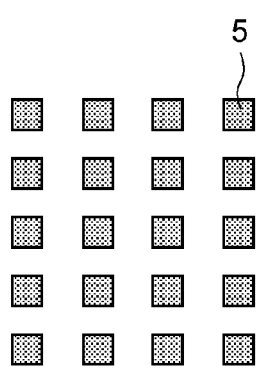
FIGS. 4A to 4C are diagrams illustrating shapes of the heat-generating medium used in the present invention.
Figure 4B:
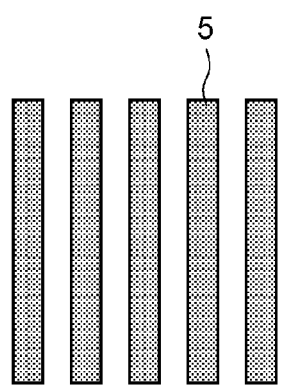
Figure 4C:
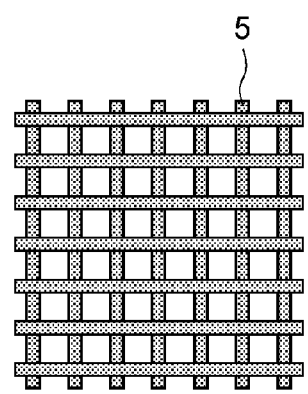

According to investigation by the present inventor, when a ratio of the area of the heat-generating medium 5 occupying the boundary surface between the cooler 1 and a reaction solution to the total area of the boundary surface is defined as a coverage rate, the coverage rate can be 20% or more and 80% or less. If the coverage rate is smaller than 20%, a hot-temperature region having a sufficient volume is not generated, and thereby the effect accelerating a chemical reaction is low. On the other hand, if the coverage rate is larger than 80%, the cooler 1 may not sufficiently cool the reaction solution. Furthermore, a coverage rate of 25% or more and 65% or less may be provided. In this range, since the balance between the effect accelerating a chemical reaction due to the arranged heat-generating medium and the effect cooling due to the cooler is optimized, the efficiency of accelerating the chemical reaction becomes the maximum. The arrangement state of the heat-generating medium 5 according to aspects of the present invention is not particularly limited, and, for example, the heat-generating medium 5 may be arranged in an island-like form as shown in FIG. 4A, a belt-like form as shown in FIG. 4B, or a mesh-like form as shown in FIG. 4C.

The coverage rate can be adjusted by a known processing method, for example, a combination of a physical or chemical film-forming method, such as sputtering, vapor deposition, or CVD, and a physical or chemical etching method, such as dry etching or wet etching. Alternatively, the coverage rate may be adjusted by a method of fixing, for example, wire, ribbon, mesh, paper, or cloth onto a surface of the cooler or the inner surface of the container.

The heat-generating medium used in aspects of the present invention is constituted of a material that at least generates heat by absorbing microwaves. The degree of heat generation due to absorption of microwaves by an arbitrary material is expressed by microwave absorption coefficient, and a larger value thereof means a higher efficiency of conversion of microwave energy to thermal energy. In general, a material having a high heat loss has a high microwave absorption coefficient. The heat loss is caused by a conduction loss, a dielectric loss, and a magnetism loss of the material for microwave energy. These depend on the chemical composition, the crystalline structure, and the constitution of the material, and in particular, the chemical composition and the crystalline structure are factors controlling them in many cases. Also according to aspects of the present invention, a material having a chemical composition and a crystalline structure that shows high conduction loss, dielectric loss, and magnetism loss can be used as the heat-generating medium. A specific example of the material showing a high conduction loss is carbon. Specific examples of the material showing a high dielectric loss include silicon carbide and aluminum oxide. Specific examples of the material showing a high magnetism loss include nickel and ferrite. These materials may be used alone or in combination thereof. In addition, these materials may be used as complexes with other materials such as resins. However, within the range in which aspects of the present invention can be conducted, the material of the heat-generating medium is not limited thereto. In aspects of the present invention, a material having a microwave absorption coefficient higher than that of a reaction solution can be used as the material of the heat-generating medium. If the material of the heat-generating medium has a microwave absorption coefficient lower than that of a reaction solution, it may be difficult to form a high-temperature region in the reaction container.

Examples of the carbon include various forms of carbon, such as fibrous carbon, carbon paper, and carbon cloth, and also include carbon mesh formed by a resin containing carbon powder. Examples of the nickel include a nickel thin film, nickel wire, nickel mesh, and a nickel thin plate formed by a film-forming method such as plating or sputtering. However, within the range in which the object according to aspects of the present invention can be achieved, the heat-generating medium is not limited thereto.

The microwave radiator used in aspects of the present invention may be a known microwave oscillator such as a magnetron, a gyrotron, a klystron, or a solid-state oscillator. The frequency of the radiated microwaves can be 0.3 to 30 GHz (wavelength: 10 mm to 1 m). The mode of the microwave may be either a single-mode or a multimode. The method of irradiation may be either continuous irradiation or intermittent irradiation. Within the range in which the object according to aspects of the present invention can be achieved, the microwave radiator is not limited thereto.

The reaction container used according to aspects of the present invention is constituted of a material that is excellent in microwave permeability and thermal conductivity. Examples of such a material include inorganic materials such as silica glass and borosilicate glass and organic materials such as resins (e.g., PTFE). However, the member of the reaction container is not limited thereto. The member of the reaction container may be constituted of one material or two or more materials. For example, when the cooler 1 and the reaction container 2 are adjacent to each other as shown in FIG. 2, a material not having microwave permeability can be applied as a member of the reaction container 2 only in the adjacent surface between the cooler 1 and the reaction container 2. In this case, in order to enhance the efficiency of cooling the inside of the reaction container 2 by the cooler 1, a material not having microwave permeability but being excellent in thermal conductivity, such as stainless steel, can be used only in the adjacent surface between the cooler 1 and the reaction container 2. For example, a reactor in which a hollow tube made of stainless steel serving as the cooler and a hollow tube made of borosilicate glass serving as the reaction container are arranged to be adjacent to each other can have a constitution described above.

The reaction container may optionally be equipped with a stirrer. Examples of the stirrer include, but not limited to, a magnetic stirrer and a mechanical stirrer.

As the cooler used in aspects of the present invention, any known cooling method or cooling apparatus can be applied within the range in which the reaction solution in the reaction container 2 can be cooled. In particular, when the cooler is a cooling apparatus in which a refrigerant is circulated inside a hollow structure, since a reduction in cooling efficiency due to absorption of microwaves by the cooler can be inhibited, aspects of the present invention can be advantageously conducted. In this case, examples of the material constituting the member of the hollow structure include, but not limited to, silica glass, borosilicate glass, and stainless steel. As the refrigerant, any chemical substance having fluidity at desired cooling temperature can be used without any particular limitation, but water can be used from the viewpoint of cost. The shape of the cooler is not particularly limited. In order to enhance the cooling performance of the cooler 1, for example, the contacting area between the cooler 1 and the reaction solution in the reaction container 2 may be increased by making the cooler in an atypical, such as spiral or double spiral, shape.

The method of producing a polymer compound according to aspects of the present invention includes a step of receiving a reaction solution containing at least a liquid solvent and a monomer in a reaction container of the microwave reactor and a step of polymerizing the monomer by irradiating the reaction solution in the reaction container with microwaves while cooling the reaction solution by a cooler.

The present inventor has found from experiments the fact that, for example, in a chemical reaction system that is easily affected by a change in temperature, such as radical polymerization for synthesizing a polymer compound, the chemical reaction is greatly inhibited by generation of a low-temperature region in the vicinity of a cooler. That is, in particular, when a radically polymerizable monomer is used, aspects of the present invention can be effectively conducted.

As the radically polymerizable monomer, a water-soluble monomer such as acrylic acid, methacrylic acid, acrylamide, styrenesulfonic acid, vinylsulfonic acid, acrylamide-2-methylpropanesulfonic acid, or methacrylsulfonic acid can be used. And also an oil-soluble monomer such as styrene, chlorostyrene, α-methylstyrene, divinylbenzene, vinyltoluene, methyl acrylate, ethyl acrylate, n-butyl acrylate, methyl methacrylate, ethyl methacrylate, or n-butyl methacrylate can be used. However, the radically polymerizable monomer according to aspects of the present invention is not limited thereto. The radically polymerizable monomers may be used alone or in combination of two or more thereof.

The reaction solution includes at least a liquid solvent and a monomer. The reaction solution may further contain a radical polymerization initiator. The radical polymerization initiator is classified into a low-temperature type, a medium-temperature type, or a high-temperature type according to the half-life temperature, and the medium-temperature type or the high-temperature type or the both can be used from the viewpoint of stability of the reaction. Examples of the radical polymerization initiator include, but not limited to, water-soluble radical polymerization initiators such as potassium persulfate and oil-soluble radical polymerization initiators such as 2,2'-azobisisobutyronitrile and benzoyl peroxide. The radical polymerization initiators may be used alone or in combination of two or more thereof.

In addition, as the liquid solvent in the reaction solution, a known liquid solvent, such as water, ethanol, or toluene, can be used. The liquid solvents may be used alone or in combination of two or more thereof.

In aspects of the present invention, by appropriately preparing compositions for the above-mentioned radical polymerization as reaction solutions, chemical reactions of various types of radical polymerization, such as solution polymerization, emulsion polymerization, soap-free emulsion polymerization, precipitation polymerization, suspension polymerization, and mini-emulsion polymerization, can be accelerated.

The reaction solution according to aspects of the present invention does not contain a component that corrodes or changes the heat-generating medium 5 before and after a chemical reaction. Furthermore, if the material constituting the heat-generating medium 5 shows a catalytic effect in an intended chemical reaction, in addition to the effects according to aspects of the present invention, an effect accelerating the chemical reaction due to the catalyst can be obtained.

In order to obtain the effects according to aspects of the present invention, it may be necessary that the heat-generating medium 5 absorbs microwaves and generates heat. Accordingly, it may be necessary to appropriately set the size of the reaction container, the temperature of the cooler 1, the reaction solution, and the material of the reaction container 2, and so on.

EXAMPLES

Examples of the present invention will be described below, but the present invention is not limited thereto.

Microwave Reactor

Figure 5:
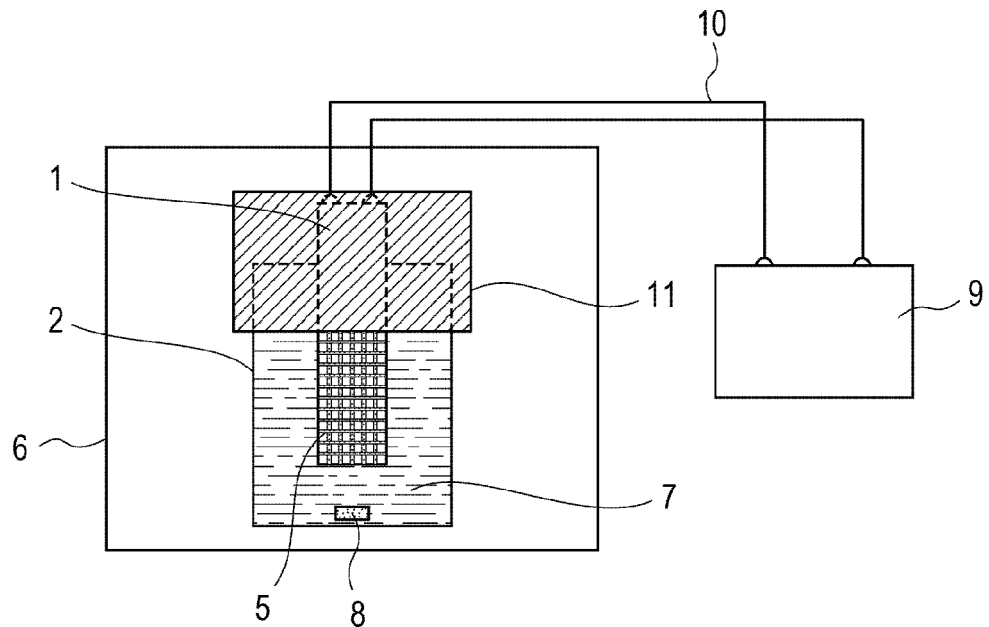
FIG. 5 is a diagram illustrating a reactor used in the present invention.

FIG. 5 is a schematic diagram of the microwave reactor used in the examples. A reaction container 2, at the center of which a cooler 1 was disposed, was installed in MicroSYNTH (manufactured by Milestone General K.K.) serving as a microwave radiation apparatus 6.

The microwave radiation mode of the microwave radiation apparatus 6 used in the examples is a multimode, and the microwaves radiated in the apparatus are diffusedly reflected to form a uniform energy distribution. Therefore, when the reaction container 2 is installed in the apparatus, microwaves enter the reaction container 2 from every direction except the bottom.

As the reaction container 2, a Pyrex (trademark) cylinder having an inside diameter of 70 mm and a height of 190 mm was used. As the cooler 1, a quartz cylinder having a hollow structure with an outside diameter of 26 mm was used. The inside of the cooler 1 had a structure for internal circulation of water. The water was controlled to a predetermined temperature by a chiller (CA-1310, manufactured by Tokyo Rikakikai Co., Ltd.) 9 that was externally connected to the cooler 1 through a tube 10. In the examples, the temperature of the water was set to that of the cooler 1. The heat-generating medium 5 was installed on the surface of the cooler 1. A reaction solution 7 and a stirrer 8 were put in the reaction container 2 to give a constitution in which the reaction solution 7 could be stirred by rotating the stirrer 8. The temperature of the reaction solution 7 was measured with an optical fiber sensor or infrared sensor (not shown in FIG. 5). In the examples, the upper portion of the reaction container was wrapped in aluminum foil 11 so that the cooler 1 would not directly absorb microwaves 4.

Example 1

An aqueous solution was prepared by mixing a mixture of 80 g of deionized water and 0.8 g of tricalcium phosphate at 10000 rpm. A solution of 0.2 g of azobisisobutyronitrile (AIBN) and 1.0 g of polyester dissolved in 20 g of styrene was added to the aqueous solution. The obtained mixture was stirred at room temperature at 10000 rpm to prepare an oil-in-water (O/W) emulsion as a reaction solution.

The reaction solution was put in a reaction container 2, and nitrogen bubbling was conducted for 30 minutes while stirring the reaction solution in a state that the temperature of the cooler 1 was set at 5° C. In this example, nickel serving as the heat-generating medium 5 was formed by electroless plating and etching in advance on the surface of the cooler 1 in an island form at a coverage rate of 35%.

The reaction solution was continuously irradiated with microwaves 4 for one hour while stirring and then was sampled. The conversion ratio of monomer was evaluated by gravimetric analysis.

The conversion ratio is a numerical value showing the degree of proceeding of polymerization and is defined as follows:

(amount of polymerized monomer)/(amount of raw material monomer)×100.

The power of microwaves 4 was appropriately controlled during the one-hour irradiation so that the temperature of the reaction solution was maintained at 80° C. or less.

Example 2

The same experimental procedure as in Example 1 was performed, except that carbon mesh (coverage rate: 73%) was used as the heat-generating medium 5 in Example 1 instead of nickel.

Comparative Example 1

The same experimental procedure as in Example 1 was performed, except that the heat-generating medium 5 in Example 1 was not arranged.

Comparative Example 2

The same experimental procedure as in Example 1 was performed, except that the coverage rate of nickel serving as the heat-generating medium 5 was changed to 100% by not performing etching in Example 1.

The conversion ratios obtained in Examples 1 and 2 and Comparative Example 2 were compared with the conversion ratio obtained in Comparative Example 1. Table 1 shows the results of Examples 1 and 2 and Comparative Example 2.

TABLE 1

|  | Heat-generating medium (coverage rate) | Fluctuation in conversion ratio |
| --- | --- | --- |
| Example 1 | Ni (35%) | +35.9% |
| Example 2 | C (73%) | +21.3% |
| Comparative Example 1 | None | — |
| Comparative Example 2 | Ni (100%) | +0.11% |

Example 3

A reaction solution was prepared by mixing 100 g of deionized water, 3 g of methyl methacrylic acid, and 0.05 g of potassium persulfate (KPS).

The reaction solution was put in a reaction container 2, and nitrogen bubbling was conducted for 30 minutes while stirring the reaction solution in a state that the temperature of the cooler 1 was set at 5° C. In this example, nickel serving as the heat-generating medium 5 was formed by electroless plating and etching in advance on the surface of the cooler 1 in an island form at a coverage rate of 35%.

The reaction solution was continuously irradiated with microwaves 4 for one hour while stirring and then was sampled. The conversion ratio of the reaction product was evaluated by gravimetric analysis. The power of microwaves 4 was appropriately controlled during the one-hour irradiation so that the temperature of the reaction solution was maintained at 70° C. or less.

Comparative Example 3

The same experimental procedure as in Example 3 was performed, except that the heat-generating medium 5 in Example 3 was not arranged.

The conversion ratio obtained in Example 3 was compared with the conversion ratio obtained in Comparative Example 3. Table 2 shows the results of Example 3.

TABLE 2

| | Heat-generating medium (coverage rate) | Fluctuation in conversion ratio |
|---|---|---|
| Example 3 | Ni (35%) | +25.9% |
| Comparative Example 3 | None | — |

Example 4

A reaction solution was prepared by dissolving 10 g of styrene, 3 g of polyvinylpyrrolidone, and 0.1 g of benzoyl peroxide (BPO) in a solution mixture of 25 g of deionized water and 60 g of ethanol.

The reaction solution was put in a reaction container 2, and nitrogen bubbling was conducted for 30 minutes while stirring the reaction solution in a state that the temperature of the cooler 1 was set at 5° C. In this example, nickel serving as the heat-generating medium 5 was formed by electroless plating and etching in advance on the surface of the cooler 1 in an island form at a coverage rate of 35%.

The reaction solution was continuously irradiated with microwaves 4 for one hour while stirring and then was sampled. The conversion ratio of the reaction product was evaluated by gravimetric analysis. The power of microwaves 4 was appropriately controlled during the one-hour irradiation so that the temperature of the reaction solution was maintained at 70° C. or less.

Comparative Example 4

The same experimental procedure as in Example 4 was performed, except that the heat-generating medium 5 in Example 4 was not arranged.

The conversion ratio obtained in Example 4 was compared with the conversion ratio obtained in Comparative Example 4. Table 3 shows the results of Example 4.

TABLE 3

| | Heat-generating medium (coverage rate) | Fluctuation in conversion ratio |
|---|---|---|
| Example 4 | Ni (35%) | +31.4% |
| Comparative Example 4 | None | — |

Example 5

A reaction solution was prepared by dissolving 5 g of styrene and 0.05 g of AIBN in 80 g of dimethylformamide (DMF).

The reaction solution was put in a reaction container 2, and nitrogen bubbling was conducted for 30 minutes while stirring the reaction solution in a state that the temperature of the cooler 1 was set at 5° C. In this example, nickel serving as the heat-generating medium 5 was formed by electroless plating and etching in advance on the surface of the cooler 1 in an island form at a coverage rate of 35%.

The reaction solution was continuously irradiated with microwaves 4 for one hour while stirring and then was sampled. The conversion ratio of the reaction product was evaluated by gravimetric analysis. The power of microwaves 4 was appropriately controlled during the one-hour irradiation so that the temperature of the reaction solution was maintained at 70° C. or less.

Comparative Example 5

The same experimental procedure as in Example 5 was performed, except that the heat-generating medium 5 in Example 5 was not arranged.

The conversion ratio obtained in Example 5 was compared with the conversion ratio obtained in Comparative Example 5. Table 4 shows the results of Example 5.

TABLE 4

| | Heat-generating medium (coverage rate) | Fluctuation in conversion ratio |
|---|---|---|
| Example 5 | Ni (35%) | +27.8% |
| Comparative Example 5 | None | — |

Example 6

An aqueous solution was prepared by mixing a mixture of 150 g of deionized water and 1.5 g of tricalcium phosphate at 10000 rpm. A solution of 0.5 g of BPO and 2.5 g of polyester dissolved in 40 g of styrene and 10 g of n-butyl acrylate was added to the aqueous solution. The obtained mixture was stirred at room temperature at 10000 rpm to prepare an oil-in-water (O/W) emulsion as a reaction solution.

The reaction solution was put in a reaction container 2, and nitrogen bubbling was conducted for 30 minutes while stirring the reaction solution in a state that the temperature of the cooler 1 was set at 5° C. In this example, the coverage rate of the heat-generating medium 5 was adjusted to 32.3% by fixing nickel mesh (manufactured by the Nilaco Corporation) serving as the heat-generating medium 5 on the entire surface of the cooler 1.

The reaction solution was continuously irradiated with microwaves 4 for two hours while stirring and then was sampled. The conversion ratio of monomer was evaluated by quantitatively determining the amount of the remaining monomer in the reaction solution by gas chromatography.

The power of microwaves 4 was appropriately controlled during the two-hour irradiation so that the temperature of the reaction solution was maintained at 70° C. or less.

Example 7

The same experimental procedure as in Example 6 was performed, except that the coverage rate of the nickel mesh serving as the heat-generating medium 5 in Example 6 was adjusted to 50.3%.

Example 8

The same experimental procedure as in Example 6 was performed, except that the coverage rate of the nickel mesh serving as the heat-generating medium 5 in Example 6 was adjusted to 63.2%.

Example 9

The same experimental procedure as in Example 6 was performed, except that the coverage rate of the nickel mesh serving as the heat-generating medium 5 in Example 6 was adjusted to 75.2%.

Comparative Example 6

The same experimental procedure as in Example 6 was performed, except that the nickel mesh serving as the heat-generating medium 5 in Example 6 was not arranged.

Comparative Example 7

The same experimental procedure as in Example 6 was performed, except that nickel foil was arranged as the heat-generating medium 5 in Example 6 at a coverage rate of 100%.

Figure 6:
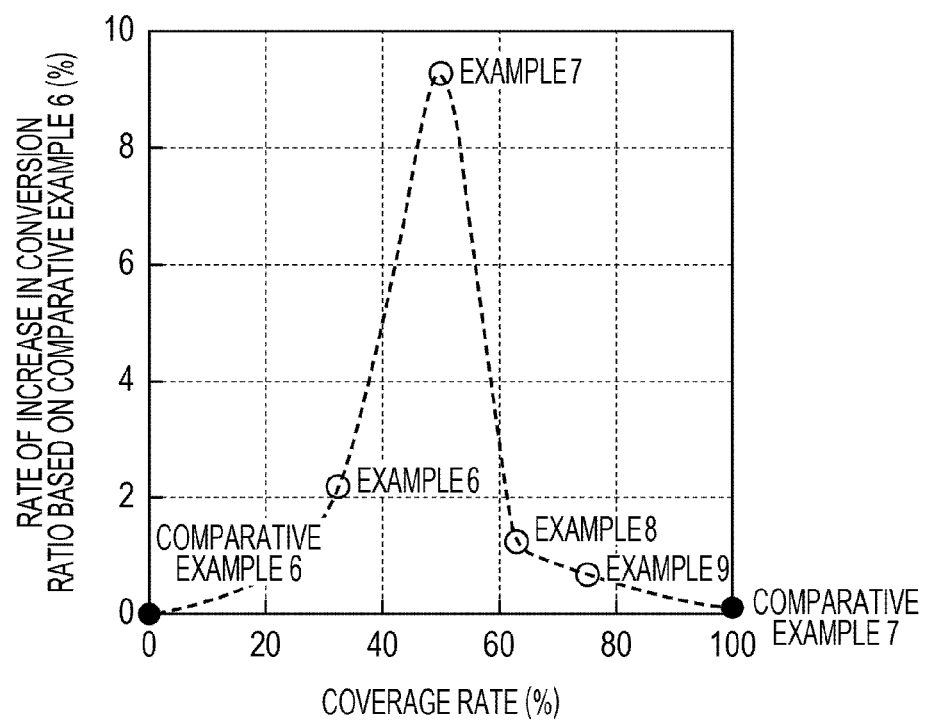
FIG. 6 is a graph showing a relationship between coverage rates of the heat-generating medium and rates of increase in conversion ratio in Examples 6 to 9 of the present invention and Comparative Examples 6 and 7.

The conversion ratios obtained in Examples 6 to 9 were compared with the conversion ratios obtained in Comparative Examples 6 and 7. FIG. 6 shows a graph plotting coverage rates of the heat-generating medium on the horizontal axis and rates of increase in conversion ratio on the basis of the conversion ratio obtained in Comparative Example 6 on the vertical axis.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-188490 filed Aug. 25, 2010, which is hereby incorporated by reference herein in its entirety.

What is claimed is:

1. A microwave reactor comprising:
   a reaction container for receiving a reaction solution;
   a microwave radiator for irradiating the reaction solution received in the reaction container with microwaves; and
   a cooler for cooling the reaction solution received in the reaction container,
   wherein a heat-generating medium generating heat by absorbing the microwaves is arranged on a surface of the cooler or in the vicinity of the surface at a position receiving the microwaves from the microwave radiator through the reaction solution.

2. The microwave reactor according to claim 1, wherein the heat-generating medium is arranged inside the reaction container.

3. The microwave reactor according to claim 1, wherein the heat-generating medium includes at least any one of carbon, nickel, silicon carbide, aluminum oxide, and ferrite.

4. The microwave reactor according to claim 1, wherein a coverage rate of the heat-generating medium arranged on the surface of the cooler or in the vicinity of the surface is 20% or more and 80% or less.

5. The microwave reactor according to claim 1, wherein a coverage rate of the heat-generating medium is 25% or more and 65% or less.

* * * * *